United States Patent
Yu

(10) Patent No.: US 10,351,331 B2
(45) Date of Patent: Jul. 16, 2019

(54) SHOCK-PROOF MINERAL CONTAINER AND MOUNTING STRUCTURE THEREOF

(71) Applicant: Chun-Ming Yu, Taoyuan (TW)

(72) Inventor: Chun-Ming Yu, Taoyuan (TW)

( * ) Notice: Subject to any disclaimer, the term of this patent is extended or adjusted under 35 U.S.C. 154(b) by 152 days.

(21) Appl. No.: 15/259,671

(22) Filed: Sep. 8, 2016

(65) Prior Publication Data

US 2017/0349357 A1 Dec. 7, 2017

(30) Foreign Application Priority Data

Jun. 7, 2016 (TW) .............................. 105118059 A

(51) Int. Cl.
| | |
|---|---|
| *B65D 1/02* | (2006.01) |
| *B65D 51/28* | (2006.01) |
| *B65D 81/38* | (2006.01) |
| *A47J 41/00* | (2006.01) |

(Continued)

(52) U.S. Cl.
CPC ....... *B65D 81/3837* (2013.01); *B65D 1/0207* (2013.01); *B65D 1/0246* (2013.01); *B65D 51/28* (2013.01); *B65D 81/3841* (2013.01); *A47G 19/2288* (2013.01); *A47J 41/00* (2013.01); *A47J 41/0005* (2013.01); *A47J 41/0072* (2013.01); *A47J 41/0077* (2013.01); *A47J 41/02* (2013.01); *A47J 41/022* (2013.01); *A47J 41/028* (2013.01)

(58) Field of Classification Search
CPC .... A47J 41/00; A47J 41/0005; A47J 41/0072; A47J 41/0077; A47J 41/02; A47J 41/022; A47J 41/024; A47J 41/026; A47J 41/028; B65D 81/3837; B65D 81/3841; B65D 81/3846; B65D 1/0207; B65D 1/0215; B65D 13/02; B65D 85/03; B65D 85/30; A47G 19/2288

USPC ................................................ 215/12.1, 12.2
See application file for complete search history.

(56) References Cited

U.S. PATENT DOCUMENTS

| | | | | |
|---|---|---|---|---|
| 1,497,764 A | * | 6/1924 | Lewis ................... | A47J 41/024 126/1 F |
| 1,706,034 A | * | 3/1929 | Moore ..................... | A61J 9/08 215/11.6 |

(Continued)

FOREIGN PATENT DOCUMENTS

TW    M500536 U    5/2015

*Primary Examiner* — Fenn C Mathew
*Assistant Examiner* — Jennifer Castriotta
(74) *Attorney, Agent, or Firm* — Muncy, Geissler, Olds & Lowe, P.C.

(57) ABSTRACT

A shock-proof mineral container and mounting structure thereof, which provides a heat insulation container with a liner formed using mineral material. The liner is provided with shock-proof protection and a mounted assembly structure. During the process of assembling the single ended suspended configuration, a blocking member having an elastic effect is inter-connected between an annular neck configured on the mineral liner and an upper link opening joined to an outer cylinder, and the elastic strain of the blocking member is used to absorb shock waves occasionally produced by an external force when carrying the container, thereby safeguarding the structural safety of the hard and brittle mineral liner. In addition, the structure is supplemented with a cylinder liner, which adds to the heat insulation capacity of the container and maintains the stability of the mineral liner.

7 Claims, 10 Drawing Sheets

(51) Int. Cl.
  *A47G 19/22* (2006.01)
  *A47J 41/02* (2006.01)

(56) References Cited

U.S. PATENT DOCUMENTS

| | | | | |
|---|---|---|---|---|
| 1,987,892 A * | 1/1935 | Duevel, Jr. | ............. | A47J 41/02 |
| | | | | 215/12.1 |
| 2,144,820 A * | 1/1939 | Thomas | ................ | A47J 41/022 |
| | | | | 215/12.1 |
| 2,419,291 A * | 4/1947 | Senter, Jr. | ............ | A47J 41/0011 |
| | | | | 215/12.1 |
| 2,575,283 A * | 11/1951 | Menrath | ............ | A45D 40/0068 |
| | | | | 215/12.1 |
| 3,705,661 A * | 12/1972 | Davis | ...................... | A47J 41/02 |
| | | | | 215/12.1 |
| 6,119,889 A * | 9/2000 | Fujii | ................... | A47J 41/0077 |
| | | | | 215/12.2 |
| 6,308,846 B1 * | 10/2001 | Muller | ............... | B65D 23/0885 |
| | | | | 215/12.1 |
| 8,225,957 B1 * | 7/2012 | Volan | ................. | A47J 41/0077 |
| | | | | 215/12.1 |

* cited by examiner

SHOCK-PROOF MINERAL CONTAINER AND MOUNTING STRUCTURE THEREOF

BACKGROUND OF THE INVENTION (a) Field of the Invention

A shock-proof mineral container and mounting structure thereof, and more particularly to a heat insulation container having a liner formed from mineral material, wherein the liner is provided with shock-proof protection and a mounted assembly structure.

(b) Description of the Prior Art

When participating in outdoor leisure activities, a great variety of designs for thermal insulation containers are on the market to preserve the temperature of foodstuffs or beverages. A thermal insulation container basically functions to provide a heat insulation effect to maintain the temperature of foodstuff or beverages. In early designs, space between the outer casing of the container and a liner was filled with heat insulation sponge or low heat conducting gas, wherein the liner was made from metal or plasticized material, which are unable to withstand the multitude of acidic or alkaline chemicals present in foodstuffs. Hence, some early designs coated the inner surface of the metal liner with Teflon as a basis to effect resistance against acidic and alkaline chemicals. However, scrubbing the coated layer of Teflon caused it to wear away.

Taiwan patent No. 103212060 provides a thermos flask with a ceramic liner. The exterior of the main body of the structure of the thermos flask (as shown in FIG. 1) is provided with an outer flask 81, and the interior space is provided with a ceramic liner 82. The upper end edge of the ceramic liner 82 is configured with an upper collar 810, which is tightly joined and assembled to a mouth edge 820 of the ceramic liner 82. After such an assembly method, because ceramic is fragile and thus inappropriate to compress, in order to join seal and effect a bonding to fill the joint clearance, the opening is cap sealed using a sealing cap 83. The ceramic liner 82 is assembled to a single end forming a suspended configuration. If the bottom end of the ceramic liner 82 is impacted by an external force and sways, then, because the material of the ceramic liner 82 is fragile, the position of the upper collar 810 easily disconnects.

SUMMARY OF THE INVENTION

The primary objective of the present invention lies in providing a shock-proof mineral container and mounting structure thereof, wherein a heat insulation container is configured with a liner formed from mineral material, and the liner is provided with shock-proof protection and a mounted assembly structure. The liner is in a single end suspended assembly and uses an end of an elastic blocking member close to a pivot to absorb shock waves of the mineral liner, thereby safeguarding the safety of the mineral liner.

Another object of the present invention lies in connecting a shoulder fastening ring to the upper end of an outer cylinder, wherein an annular shoulder fastening ring uses an axial fastening method to join to an annular neck configured on the mineral liner through a blocking member and form a dry-type strong clasp assembly, which eliminates the use of other inorganic adhesives; moreover, the elastic effect of the blocking member is used to absorb shock waves of the mineral liner and to cover the annular neck to achieve a thermal insulation effect.

The third object of the invention lies in separating out an inter layer between the outer surface of the mineral liner and the inner surface of the outer cylinder, and covering the exterior of the mineral liner with an internal reflection layer able to effect internal reflection of heat waves.

The fourth object of the invention lies in coaxially lining the internal space of the outer cylinder with a cylinder liner, wherein the interior of the cylinder liner enables the mineral liner to be longitudinally inserted therein, and defining a dual walled heat blocking surrounding layer between the outer surface of the cylinder liner and the inner surface of the outer cylinder to provide a vacuum effect.

The fifth object of the invention lies in the mineral liner being manufactured from ceramic material, and coating the interior surface thereof with an enamel crystallized layer.

The sixth object of the invention lies in basing the assembly of the outer cylinder and the mineral liner on a bridge configured on the shoulder fastening ring, wherein the shoulder fastening ring is provided with a press opening and an inner cone ring used to effect an axial front and rear fastening method to bind onto the annular neck configured on the mineral liner; moreover, the lower end of the shoulder fastening ring fastens onto a contracted opening of the outer cylinder, and the outer cylinder and the mineral liner are assembled to form the container main body.

The seventh object of the invention lies in forming a lip with a smooth surface on the upper end of the annular neck configured on the mineral liner, wherein the lip is higher than the height of the press opening, and the high measure is used to accommodate the mouth when drinking and for easy cleaning.

To enable a further understanding of said objectives and the technological methods of the invention herein, a brief description of the drawings is provided below followed by a detailed description of the preferred embodiments.

DETAILED DESCRIPTION OF THE PREFERRED EMBODIMENTS

The present invention discloses a shock-proof mineral container and mounting structure thereof, which provides a heat insulation container having a liner formed from mineral material, wherein the liner is provided with shock-proof protection and a mounted assembly structure that is configured as a cantilever system. In the cantilever system, stress on one end of the lever of force forms a torque on a pivot position, and the stress produced is concentrated on the pivot position close to the lever of force. Hence, when overburdened, the cantilever fractures. The present invention configures the mineral liner in a single end suspended assembly structure, and uses a blocking member provided with an elastic effect that absorbs the shock waves concentrated at one end of the suspend assembled mineral liner, thereby maintaining the structural safety of the suspended state of the mineral liner.

During the assembly process of the container, in order to use a dry-type fastening assembly, the annular mechanical strength of a shoulder fastening ring is used to enable strong joining to the mineral liner, as well as providing the convenience for reverse replacement and maintenance of components.

Furthermore, the interior of an outer cylinder is fitted with a cylinder liner, and an inner base plate is fitted inside the cylinder liner. The inner base plate is able to provide elastic support for a base plate of the mineral liner to form a two-point alignment support relationship, which assists in absorbing longitudinal and radial shock waves of the mineral liner. Furthermore a vacuum pressure heat blocking surrounding layer envelopes and is formed between the outer surface of the cylinder liner and the inner surface of the outer cylinder to extend the heat insulation time of the container.

Ceramic material is used for the mineral liner, and an enamel crystallized layer is applied to the inner surface of the mineral liner. The enamel crystallized layer is provided with physical energy, such as far-infrared waves, which is able to improve the molecular structure of beverages or food material placed in the container by activating the molecules of the beverage or food material. If the mineral liner is made from transparent material, then the periphery thereof can be enclosed by a internal reflection layer able to reflect heat waves toward the interior of the mineral liner, thereby preventing the phenomenon of heat dissipation by radiation and assisting heat insulation effectiveness.

An outward protruding lip of the mineral liner accommodates the mouth when drinking and facilitates easy cleaning thereof.

Regarding the detailed structure and assembly process of the present invention, please refer to the description of the diagrams as follows.

Figure 1:
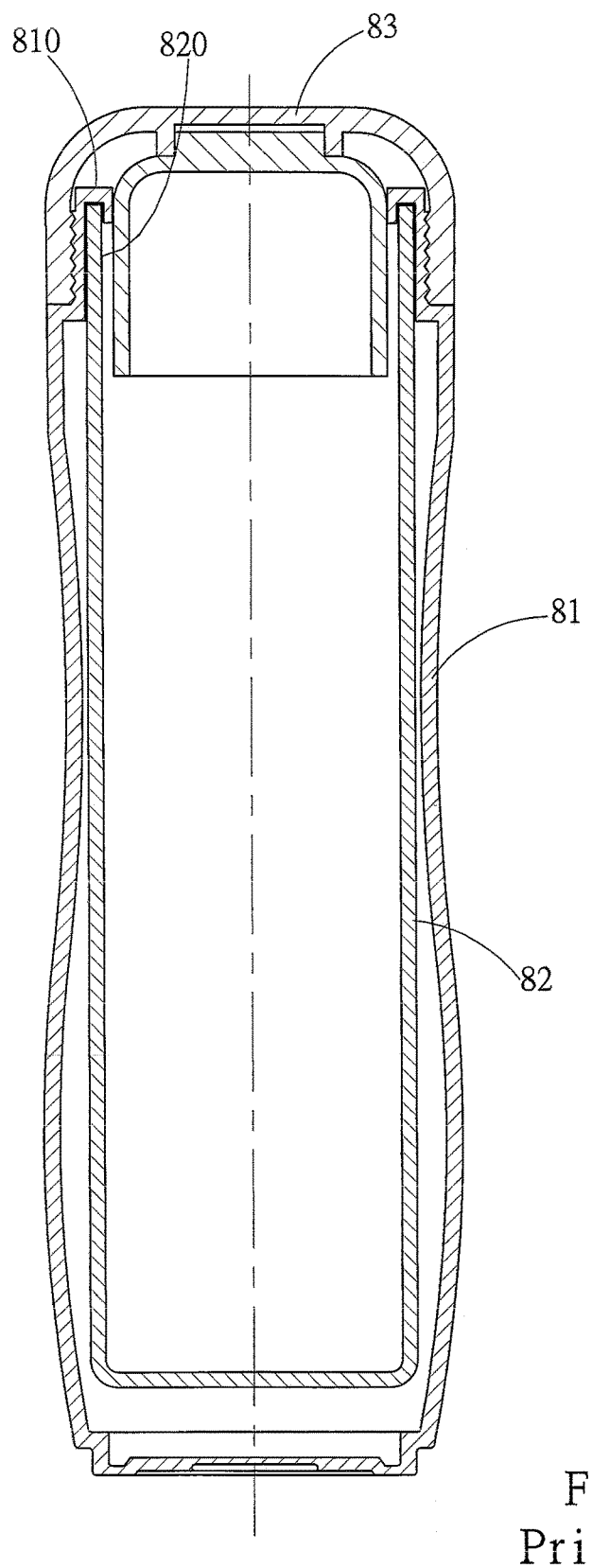
FIG. 1 is a cut-away view depicting the structure of a vacuum flask provided with a ceramic liner of the prior art.
Figure 2:
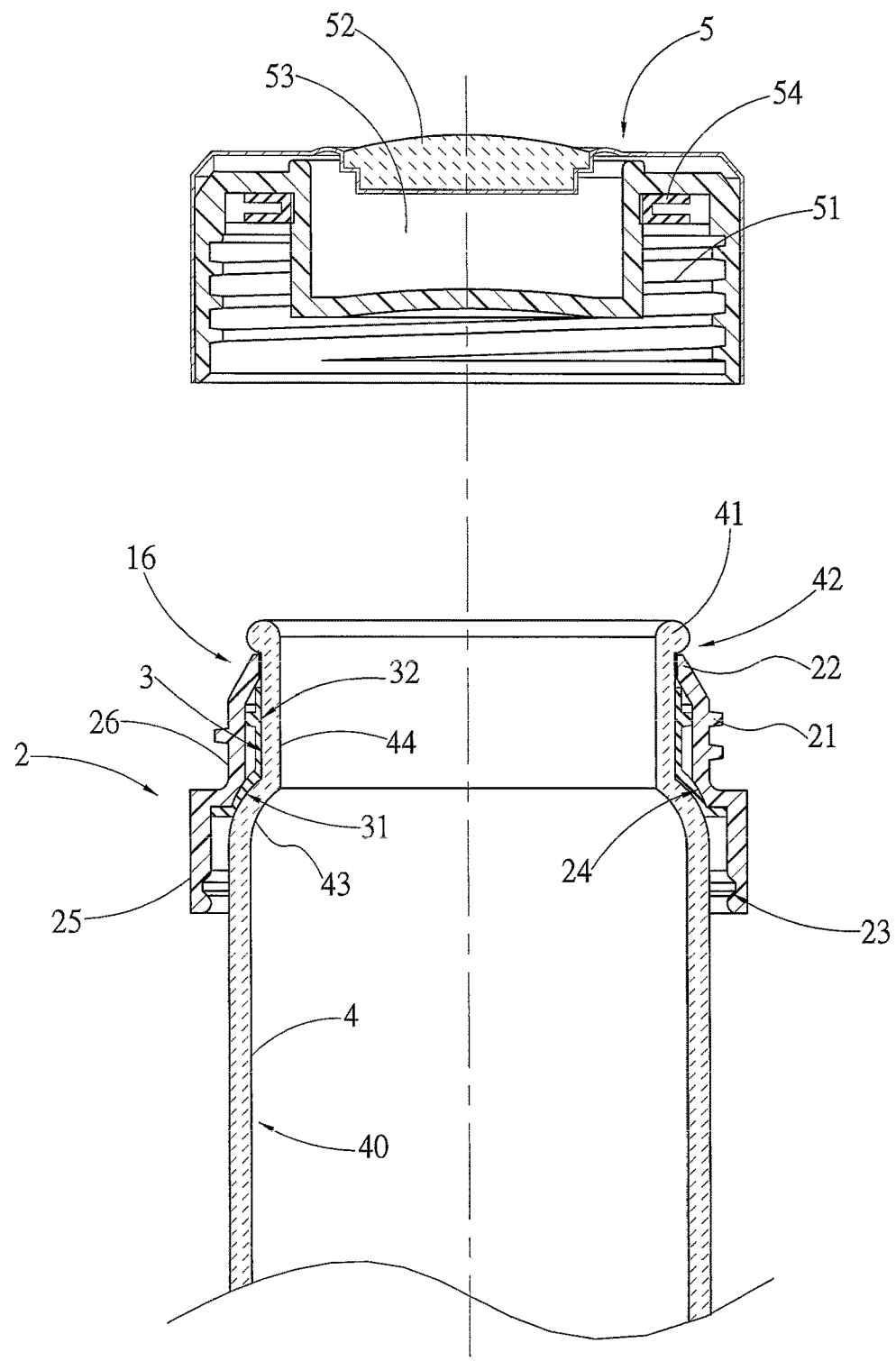
FIG. 2 is a structural relationship view of a shoulder fastening ring in relation to a mineral liner and a cap according to the present invention.
Figure 3:
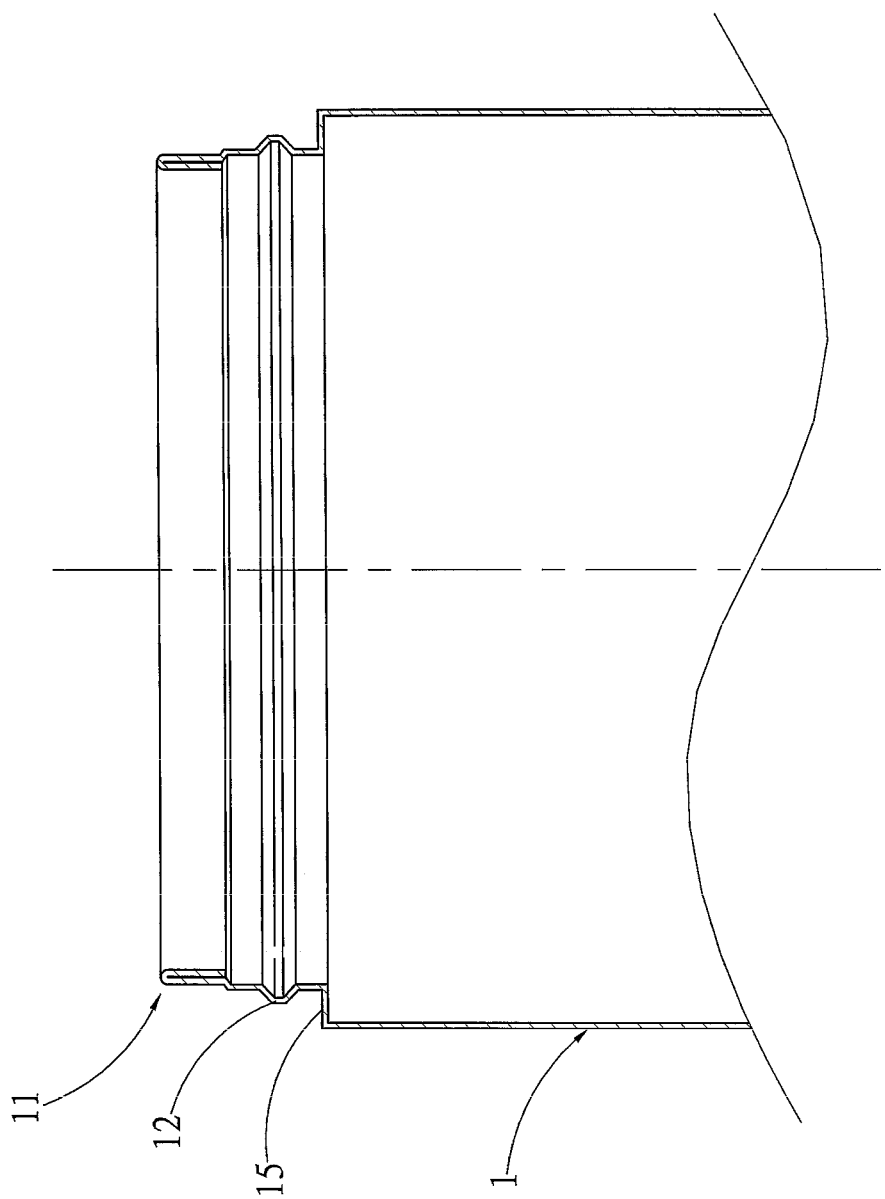
FIG. 3 is a structural view of a contracted opening of an outer cylinder of the present invention.

Referring first to FIGS. 2 and 3, which show a container of the present invention. The container is cylindrical shaped or circular shaped having a longitudinal axis, and primarily comprises a single layer mineral liner 4 manufactured from hard-brittle material. The upper end of the mineral liner 4 is contracted to configure an annular neck 44 through an extended shoulder portion 43, and a lip 41 is formed on the upper end of the annular neck 44. The periphery of the lip 41 is configured to form a fastening portion 42, and the lower end of an annular shoulder fastening ring 2 is provided with an embed link opening 25. The upper end of the shoulder fastening ring 2 is a restrain link opening 26, and threaded teeth 21 are provided on the exterior of the restrain link opening 26. A ring clasp groove 23 radially encircles the inner circumference of the embed link opening 25, and an inner cone ring 24 is configured on the girth region of the embed link opening 25. The upper end of the restrain link opening 26 bevels inward and contracts to configure a press opening 22, and the press opening 22 push fastens onto the fastening portion 42 configured on the upper outer end of the mineral liner 4. The inner cone ring 24 press fastens onto the outer surface of the beveled shoulder of the extended shoulder portion 43. A buffer cone ring 31 extending from an elastic blocking member 3 clasp connects between the inner surface of an inner cone ring 24 and the outer surface of the extended shoulder portion 43. The inner and outer surfaces of the buffer cone ring 31 are subjected to frictional restraint from the inner surface of the inner cone ring 24 and the outer surface of the extended shoulder portion 43 and clasp connected therebetween. The clasp connecting force originates from the annular mechanical structural force of the shoulder fastening ring 2, and the beveled surfaces of the extended shoulder portion 43 are used to enable the fastening portion 42 to be push fastened by the press opening 22, thereby causing the inner surface of the inner cone ring 24 to axially clasp press onto the outer circumferential surface of the extended shoulder portion 43. Accordingly, the need for inorganic glue is eliminated by using a pure dry-type mechanical fastening assembly operation, which apart from facilitating reverse replacement and convenient maintenance, such a structural assembly also prevents pollution from harmful substances.

The inner cone ring 24 of the shoulder fastening ring 2 and the press opening 22 are used to front and rear clasp fasten the outer circumferential surface of the annular neck 44 of the mineral liner 4, which further clasps the blocking member 3. The upper section of the blocking member 3 is a buffer ring 32, which uses a covering method to cover the external exposed surface of the annular neck 44. The internal space of the annular neck 44 produces a heat insulation effect, and the buffer cone ring 31 can additionally absorb shock waves of the mineral liner 4.

The inner circumference of the embed link opening 25 is radial annular provided with the ring clasp groove 23, and the ring clasp groove 23 enables an annular protruding fastening ring 12 configured on the outer surface of a contracted opening 11 provided on an outer cylinder 1 to be fastened therein. After fastening the outer cylinder 1 to the shoulder fastening ring 2, the position of the upper end opening of the shoulder fastening ring 2 is defined to be an upper link opening 16 of the container body. The upper link opening 16 enables linking with the lip 41 of the mineral liner 4. The bridge of the shoulder fastening ring 2 is used to support the mineral liner 4 to enable coaxial suspension in the interior of the outer cylinder 1, and the threaded teeth 21 provided on the restrain link opening 26 of the upper section of the shoulder fastening ring 2 are used to enable inner threaded teeth 51 provided on the inner circumference of a cover 5 to screw on and connect thereto. The upper surface of the cover 5 is indented with an inner compartment 53, and the inner compartment 53 is sealed using an upper fastening lid 52. The inner compartment 53 can serve as a heat insulated space, and can also serve as a space for containing dry materials, such as tea leaves or coffee powder.

An inner end surface of the cover 5 is fitted with a sealing gasket 54 that correspondingly covers the ring position covering the lip 41. After a covering and locking operation of the cover 5, the elastic deformation of the sealing gasket 54 is used to enable press joining on the outer surface of the lip 41 to form an airtight lock press.

The upper end of the outer cylinder 1 is provided with the contracted configuration of the contracted opening 11 on a shoulder opening 15, and the measurement of such a contracted configuration is able to pass over the thickness of the embed link opening 25 of the shoulder fastening ring 2, thereby enabling assembly of the shoulder fastening ring 2 to the outer cylinder 1, and at least perfectly aligning the shoulder fastening ring 2 and the outer surface of the shoulder opening 15.

Figure 4:
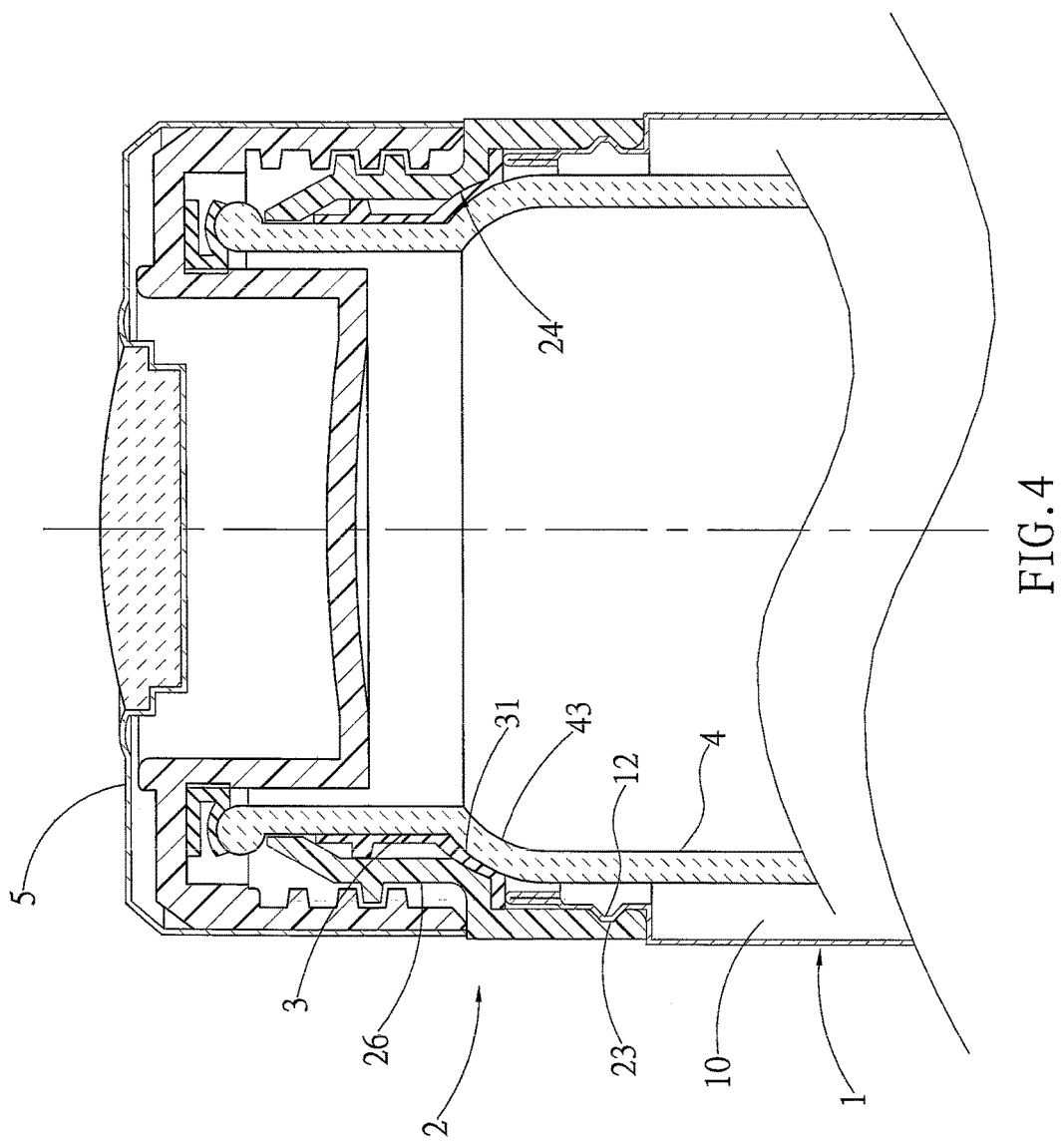
FIG. 4 is a cross-sectional view of an upper portion after assembly of the container according to the present invention.
Figure 5:
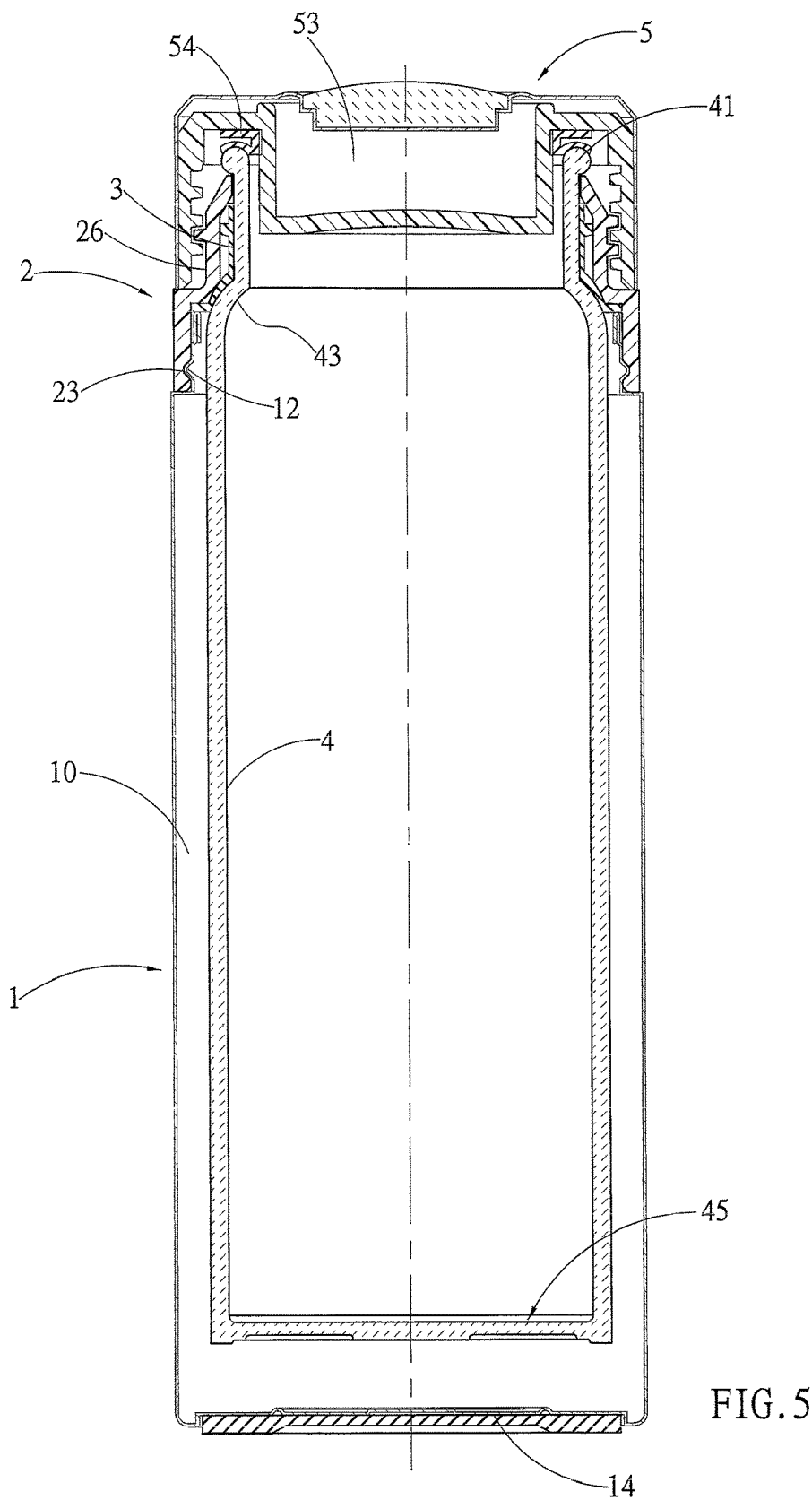
FIG. 5 is a schematic view depicting the formation of an inter layer after assembly of the present invention.

Referring to FIGS. 4 and 5, which show the upper end of the shoulder fastening ring 2 enabling lock joining of the cover 5 and press joining of the buffer cone ring 31 of the blocking member 3 between the inner surface of the inner cone ring 24 of the shoulder fastening ring 2 and the beveled outer surface of the extended shoulder portion 43 of the mineral liner 4. Such an assembled system is to enable a coaxial superposed assembly using the buffer cone ring 31 to effect absorption of shock waves of the mineral liner 4, An inter layer 10 is separated out between the outer surface of the mineral liner 4 and the inner surface of the outer cylinder 1, and the inter layer 10 is a gaseous space, thereby separating heat dissipating from the mineral liner 4 from the outside. The mineral liner 4 is subjected to the axial suspension and joining to the bridge of the shoulder fastening ring 2 in the interior of the outer cylinder 1. The elastic buffer cone ring 31 is inter-connected between the shoulder fastening ring 2 and the extended shoulder portion 43 of the mineral liner 4, and the lower end of the shoulder fastening ring 2 is the restrain link opening 26. The inner circumference of the restrain link opening 26 is provided with the ring clasp groove 23, which enables the fastening ring 12 of the outer cylinder 1 to fasten thereto. The inter layer 10 similarly runs between and separates a base plate 45 of the mineral liner 4 from a base 14 of the outer cylinder 1. Accordingly, the structural inter layer 10 is able to effect spatial separation of the exterior of the mineral liner 4 to prevent external air flow dissipating the outer surface temperature of the mineral liner 4 and, thus, reducing the internal heat equilibrium effect of the mineral liner 4.

The inner compartment 53 provided in the cover 5 also effects heat blocking of the internal space at the upper end of the mineral liner 4. The sealing gasket 54 press joined to the upper edge of the lip 41 enables reliable sealing of the internal space of the mineral liner 4 from the outside.

Figure 6A:
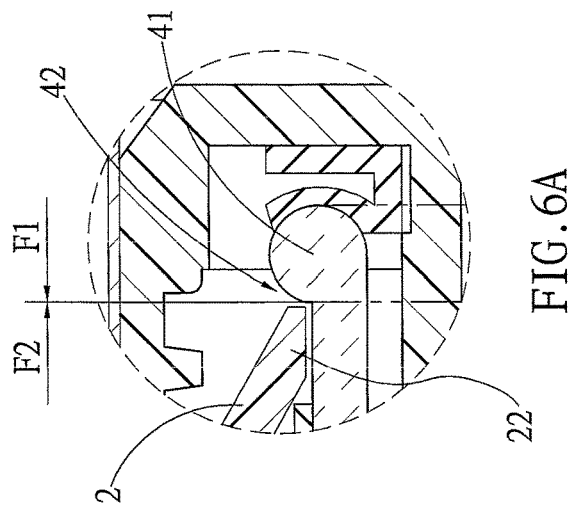
FIG. 6A is a partial enlarged schematic view depicting the mineral liner subjected to an external force shock wave according to the present invention.
Figure 6:
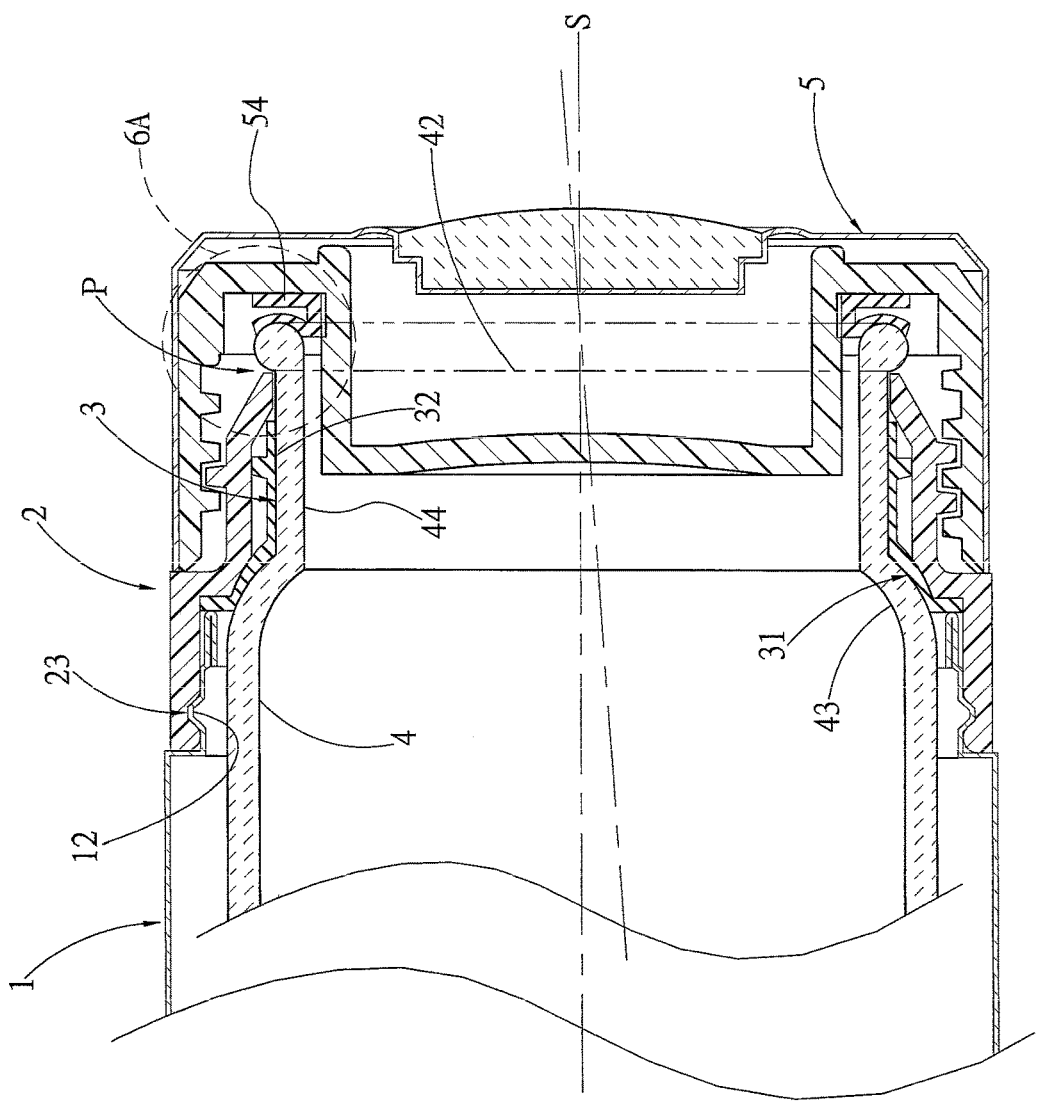
FIG. 6 is a schematic view depicting the mineral liner subjected to an external force shock wave according to the present invention.

Referring to FIGS. 6 and 6A, which show completion of the aforementioned structural assembly, wherein, when the outer cylinder 1 is subject to an impact, a mass inertia effect causes a cantilever angular eccentric sway of the mineral liner 4, this deflection then forms a force moment effect, whereupon a point on the lip 41 serves as a pivot P and the force moment acts in the direction of the position of the extended shoulder portion 43 producing shock waves. The outer surface of the extended shoulder portion 43 absorbs the distorting stress produced by the shock waves through the buffer cone ring 31, which basically serves as a safeguard to ensure the safety of the entire body of the mineral liner 4.

The force moment occurs on the annular periphery of the fastening portion 42, and the pivot P forms at a point position opposite to the eccentric swaying direction of the mineral liner 4 through a center line S. The single body of the blocking member 3 is provided with elastic deformability, which will compress out a varying displaced space after being impacted by a force, thereby yielding a space for eccentric swaying movement of the mineral liner 4.

When the outer surface of the container is subjected an external force, because the mineral liner 4 has mass, a downward eccentric swaying angular position variation is produced between the outer cylinder 1 and the relative axis of the shoulder fastening ring 2 joined to the outer cylinder 1, at which time, the fastening portion 42 effects a joining loop line with the press opening 22, and the transient pivot P is produced at a position on a point based on a reverse direction to the swaying direction. The fastening portion 42 of the lip 41 produces an acting force F1 at the position of the pivot P that presses a corresponding end point of the press opening 22. At which time, the press opening 22 produces a reciprocal reacting force F2, and forms the pivot P. Through the surface at a crosswise position of an opposite pivot P through the center line S, the eccentric swaying force moment effect causes the outer surface of the extended shoulder portion 43 of the mineral liner 4 to compress the buffer cone ring 31 configured on the blocking member 3, thereby enabling the elastic strain of the buffer cone ring 31 to form a damping effect to absorb the force moment.

In addition, the force moment caused by impact from an external force is normally a surge force, thus, the buffer cone ring 31 is able to instantaneously absorb the stress produced by the torsional moment and maintain structural safety.

The mineral liner 4 is assembled by means of a suspension configuration and is provided with mass, especially when the interior is full of a liquid beverage, which increases the mass of the mineral liner 4. When the container is impacted by an external force, the mass inertia of the mineral liner 4 produces an eccentric swaying force moment on the annular neck 44 in the assembled structure. The occurrence of the eccentric sway angle depends on the pivot P, and the outer surface of the extended shoulder portion 43 through the surface at a crosswise position of an opposite pivot P through the center line S, which presses the buffer cone ring 31 causing the buffer ring 32 to deform, thereby yielding a measure of space therebetween. The size of the measure of space is specified by the size of the eccentric sway angle of the mineral liner 4, and primarily relies on using the elastic deformation capacity of the buffer cone ring 31 to absorb the eccentric sway pressure on the outer surface of the extended shoulder portion 43 to form an elastic damping effect, thereby forming a space that protects the mineral liner 4. In particular, maintaining the structural safety of the position of the extended shoulder portion 43.

During the eccentric swaying process, if the cover 5 is covering the container, the sealing gasket 54 fitted in the interior of the cover 5 is also an elastic member, which press joins on the circular surface of the lip 41. Apart from the mutual area of the lip 41 at the point of the pivot P, because of linked displacement caused by eccentric swaying, any point on the lip loop will effect absorption of spatial change or displacement energy on the lip 41, thereby assisting the absorption working capacity of the buffer cone ring 31, as well as adding to the safety and protection of the structure of the mineral liner 4.

Figure 7:
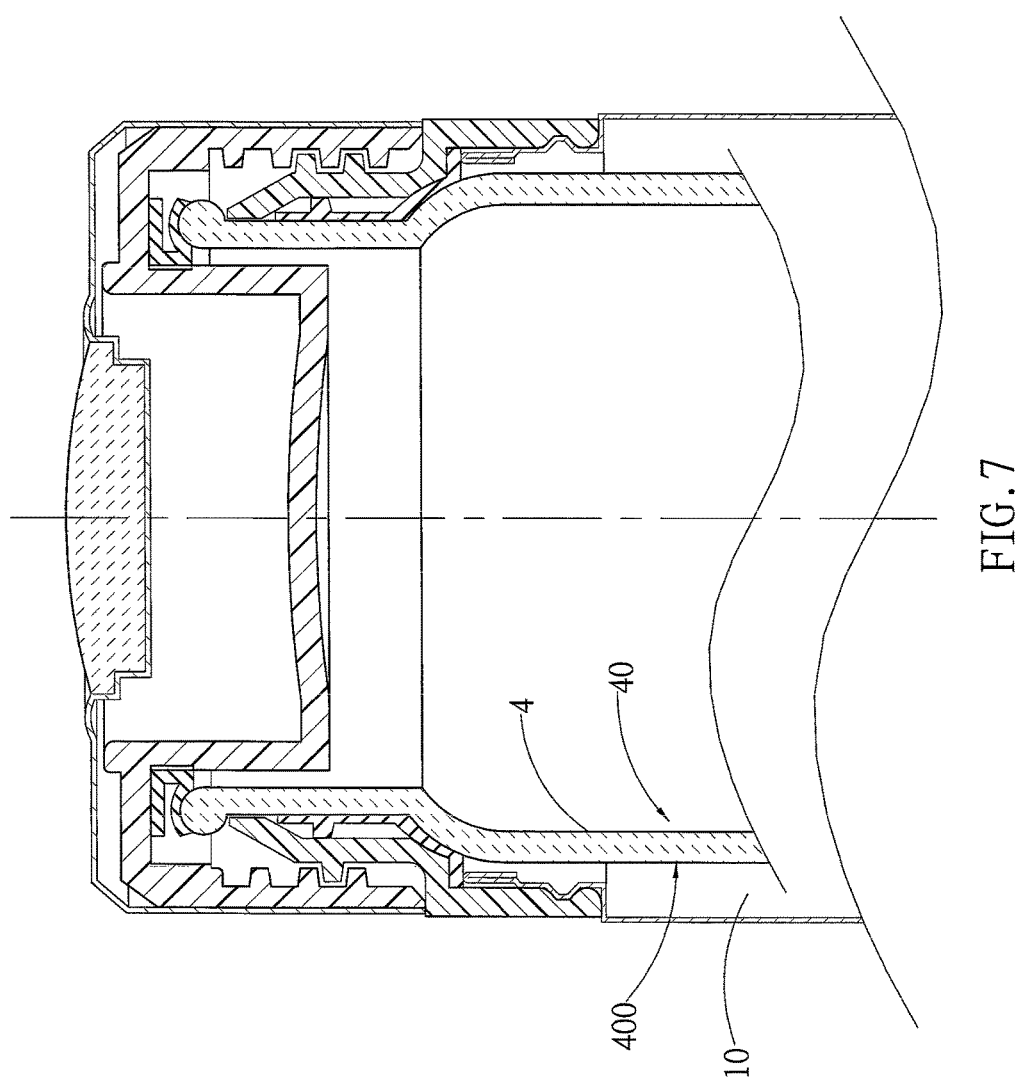
FIG. 7 shows an embodiment of the present invention depicting the mineral liner made from glass material.

Referring to FIG. 7, which shows the mineral liner 4 of the present invention, wherein the material used for the mineral liner 4 is a mineral, and the mineral is ceramic material. An enamel crystallized layer 40 is applied to the inner surface of the ceramic material of the mineral liner 4. The enamel crystallized layer 40 enables the inner surface of the mineral liner 4 to better withstand cleaning, and provide a smooth surface to the mineral liner 4, which prevents tea scale or grease stains from easily adhering to the surface. In addition, the enamel crystallized layer 40 imparts a substance with physical energy (not shown in the drawings), such as energy produced by far-infrared waves, which are able to activate water molecules to become more active, which improves the taste of foodstuff, or refine the agglomeration of water molecules.

If the mineral liner 4 is made from glass able to produce a refraction effect, then an internal reflection layer 400 can be applied to the periphery of the mineral liner 4. The function of the internal reflection layer 400 is to achieve a reflection effect on heat waves produced in the interior of the mineral liner 4, reflecting the heat waves back into the interior of the mineral liner 4, thereby assisting in prolonging the heat preservation effectiveness. The internal reflection layer 400 can be an evaporated film of mercury that is directly applied to the outer surface of the mineral liner 4, or a surround structure method can be used inside the space of the inter layer 10 to encircle the outer surface of the mineral liner 4, such as coating with aluminized paper or any kind of paper having a metal bright surface capable of reflection.

Figure 8:
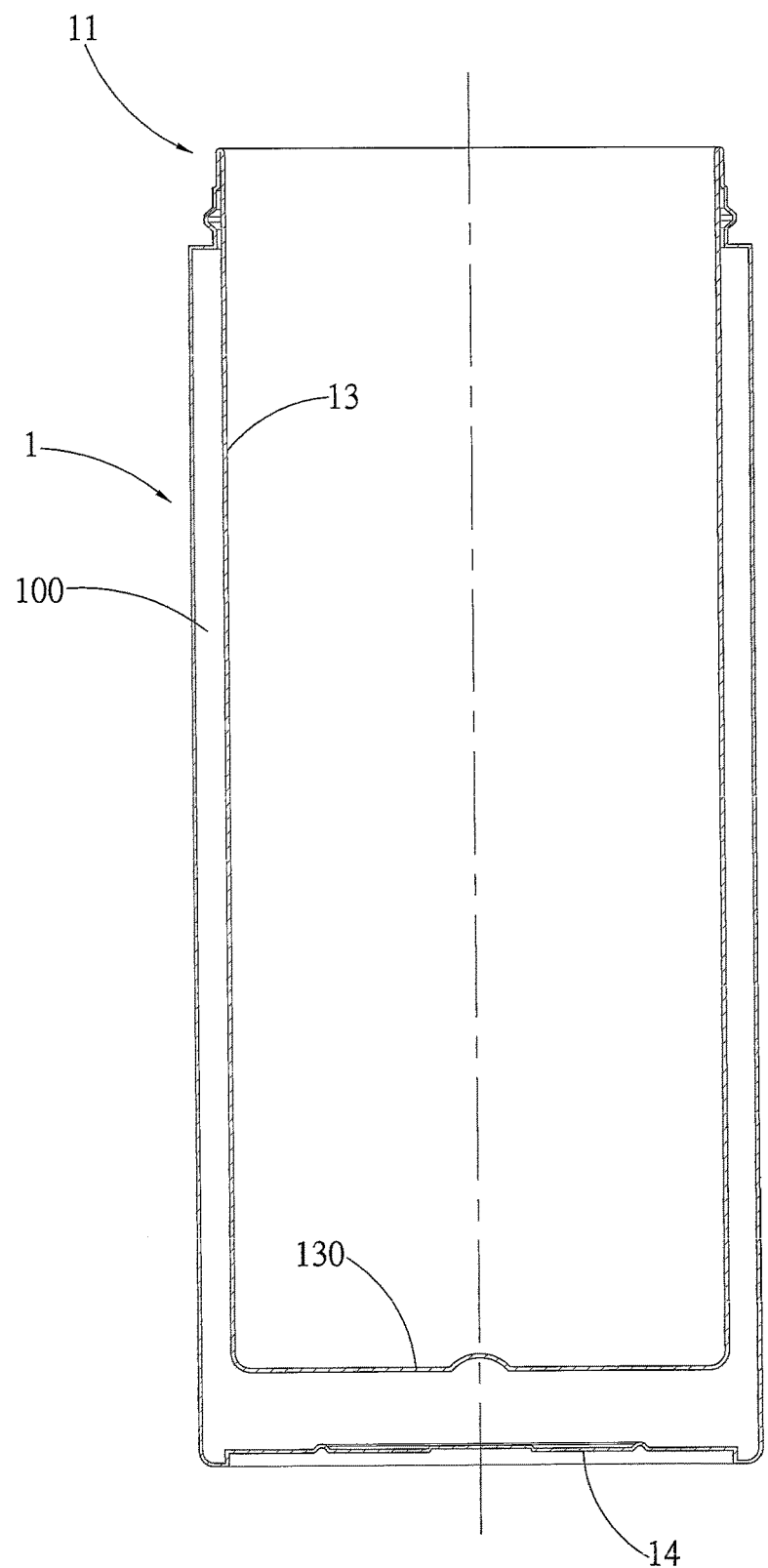
FIG. 8 is a structural schematic view depicting the interior of the outer cylinder forming a heat blocking surrounding layer according to the present invention.

Referring to FIG. 8, which shows the internal space of the outer cylinder 1 of the present invention coaxially lined with a cylinder liner 13. The lower plate of the cylinder liner 13 is an inner base plate 130, which faces the base 14 of the outer cylinder 1, thereby defining a dual walled heat blocking surrounding layer 100. The heat blocking surrounding layer 100 is manufactured to be in a vacuum state, the vacuum pressure of which is below 10 torr; or the space inside the heat blocking surrounding layer 100 can be filled with low heat conducting gas. The cylinder liner 13 and the outer cylinder 1 are manufactured from thin metallic material, the structural mechanical strength of which is pressure resistant and can tolerate vacuum pressure compression. The outer surface of the upper end opening of the cylinder liner 13 is joined to the inner surface of the contracted opening 11 of the upper end of the outer cylinder 1. There is a join sealed relationship between the outer circumference of the upper end of the cylinder liner 13 and the inner circumference of the contracted opening 11 to seal a circular shaped space of the heat blocking surrounding layer 100.

Figure 9:
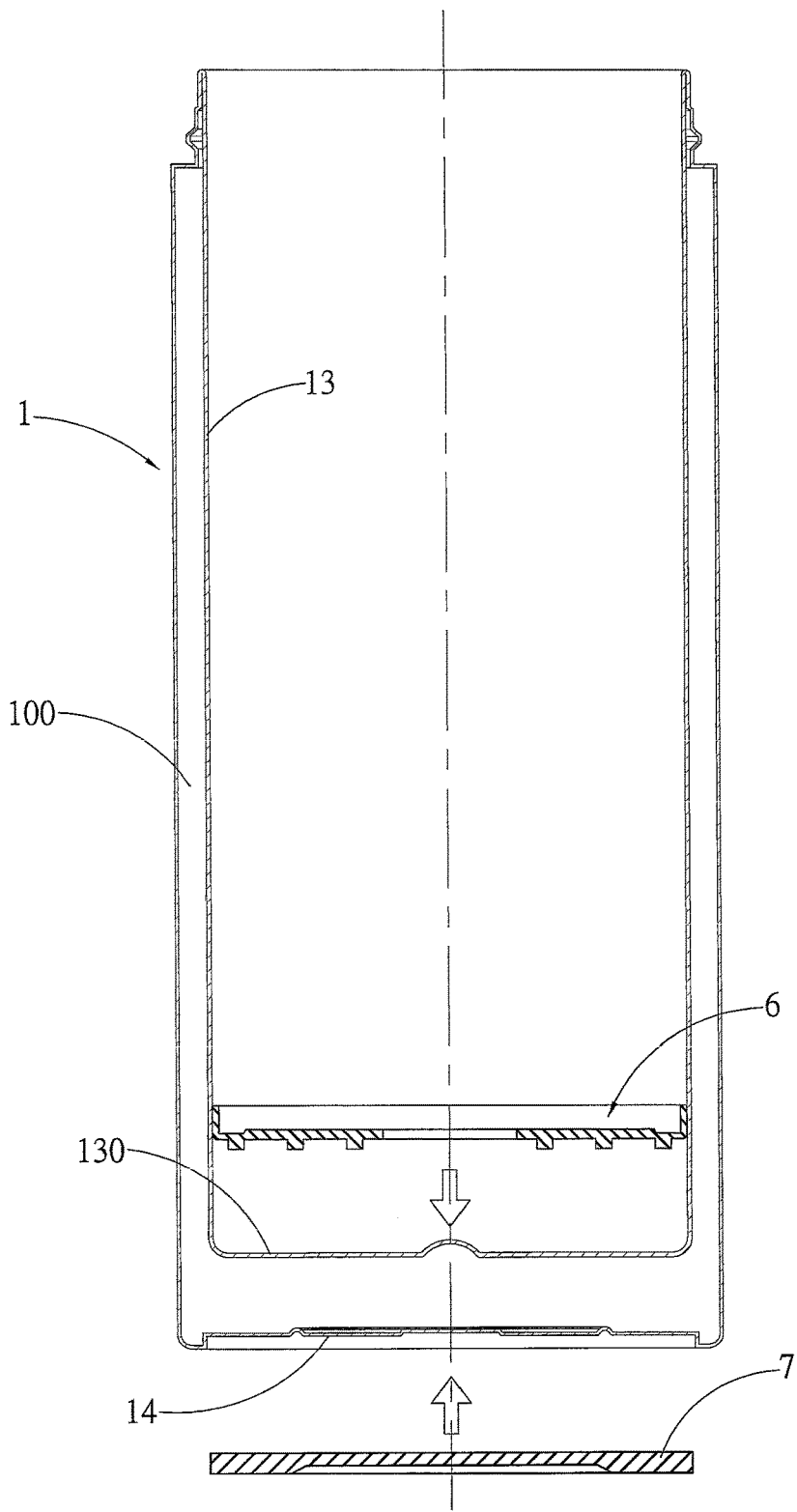
FIG. 9 is a schematic view of the present invention installed with a positioning disc and an slide pad.
Figure 10:
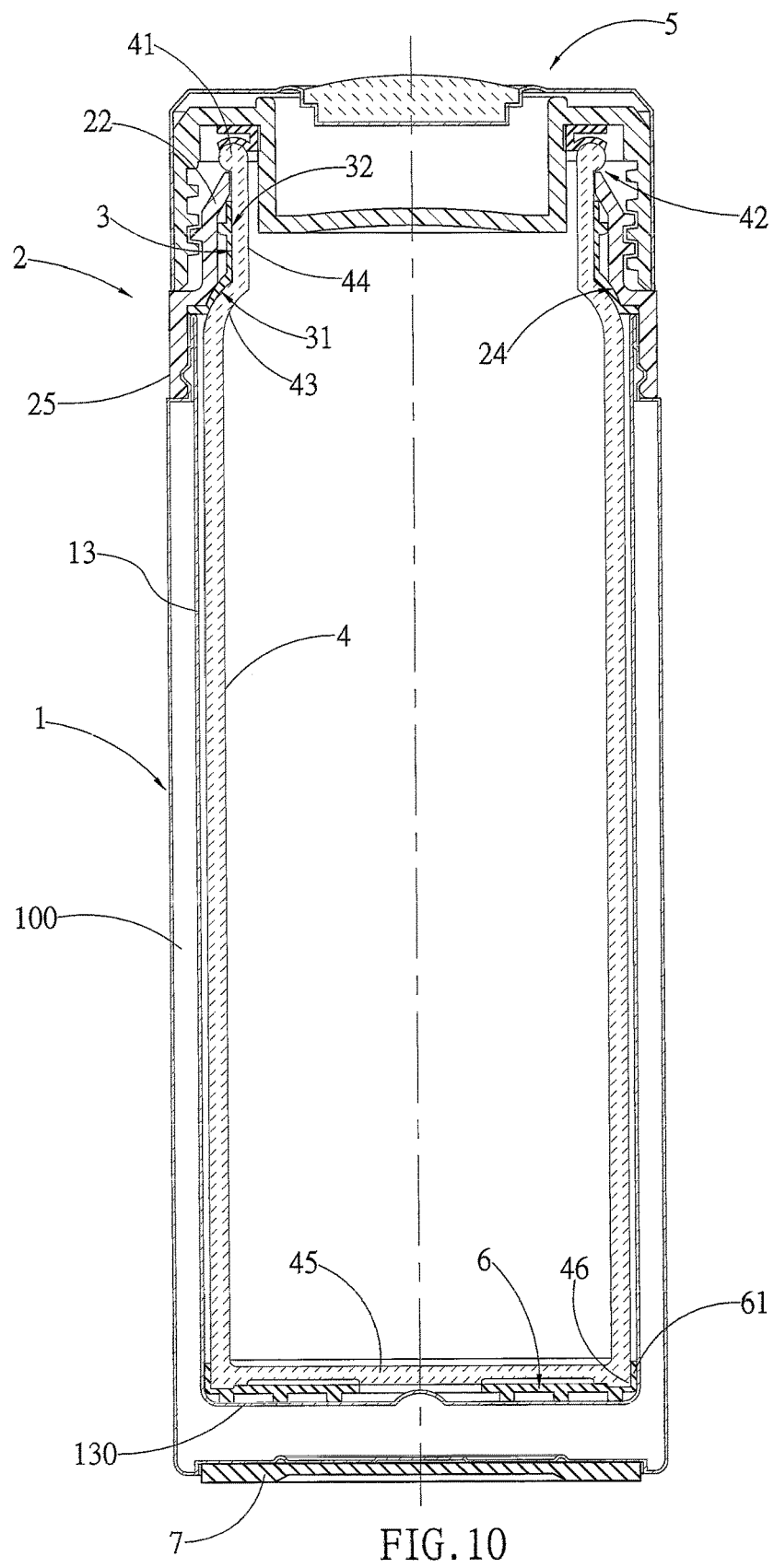
FIG. 10 is a schematic view depicting the bottom portion of the mineral liner supported by the positioning disc according to the present invention.

Referring to FIGS. 9 and 10, which show the outer cylinder 1 and the cylinder liner 13 respectively provided with the inner base plate 130 and the base 14, respectively in the lower portions thereof. An elastic positioning disc 6 is fitted to the inner base plate 130, and the outer surface of the base 14 is assembled with an slide pad 7 provided with an anti-slip effect. The heat blocking surrounding layer 100 is joined between the outer cylinder 1 and the cylinder liner 13. The buffer cone ring 31 configured on the blocking member 3 provides cushioning between the extended shoulder portion 43 configured on the upper end of the mineral liner 4 and the inner circumference of the inner cone ring 24 configured on the shoulder fastening ring 2. Moreover, the press opening 22 provided on the shoulder fastening ring 2 abuts and fastens onto the lip 41 of the annular neck 44. The annular mechanical force of the shoulder fastening ring 2 enables the inner surface of the inner cone ring 24 to press fasten onto the outer surface of the extended shoulder portion 43, thereby fastening the annular neck 44 of the mineral liner 4, and safeguarding the overlapping of the axis of the mineral liner 4 and the axis of the outer cylinder 1. The cylinder liner 13 is longitudinally mounted in the internal space of the outer cylinder 1, and the inner base plate 130 of the cylinder liner 13 is padded with the elastic positioning disc 6 on the inner side thereof. The rim of the positioning disc 6 is provided with a ring 61 that can cover an outer circumference angled end 46 of the base plate 45. The positioning disc 6 is used to longitudinally absorb longitudinal shock waves of the mineral liner 4, and the ring 61 is able to absorb radial shock wave of the base plate 45. When in use, the slide pad 7 provides anti-slip effectiveness when the container of the present invention is placed on a table top, or absorbs impact sounds when placing the container down.

The upper end of the mineral liner 4 of the present invention is configured with the oblique extended shoulder portion 43, and the periphery of the lip 41 is provided with the fastening portion 42, which enable front and rear axial fastening of the press opening 22 provided on the shoulder fastening ring 2 and the inner cone ring 24. The annular mechanical force of the shoulder fastening ring 2 is used to effect a compact fastening assembly on the annular neck 44 of the mineral liner 4. The blocking member 3 provides cushioning between the shoulder fastening ring 2 and the annular neck 44, which enables the blocking member 3 to absorb torsion or shock waves from the extended shoulder portion 43 caused by swaying. In addition, the buffer ring 32 of the blocking member 3 is used to cover the outer surface of the annular neck 44 to further realize a heat insulation effect. The embed link opening 25 provided on the shoulder fastening ring 2 is joined to the upper end of the outer cylinder 1, and the interior of the outer cylinder 1 can be further fitted with the cylinder liner 13, to allow the corresponding space to form the heat blocking surrounding layer 100. The inner base plate 130 disposed at the bottom portion of the cylinder liner 13 is indirectly joined to the positioning disc 6 that absorbs longitudinal of the mineral liner 4 or radial shock waves, thereby further completely safeguarding the structural safety of the mineral liner 4 and increasing effectiveness against breakage. The blocking member 3 is used to effect absorption of shock waves, which safeguards the structural safety of the mineral liner 4; moreover, the positioning disc 6 is used as an additional safeguard to provide complete protection for the mineral liner 4 fitted inside the heat insulated container. Accordingly, the present invention is truly an innovative design, and, thus, earnestly request the patent examiner, after detailed examination, to approve this patent application at the earliest convenience.

It is of course to be understood that the embodiments described herein are merely illustrative of the principles of the invention and that a wide variety of modifications thereto may be effected by persons skilled in the art without departing from the spirit and scope of the invention as set forth in the following claims.

What is claimed is:

1. A mounting structure of a shock-proof mineral container, which provides a heat insulation container with a liner formed using mineral material, a mounted mineral liner achieves providing a shock-proof structure, and achieves assembly of a container using a dry-type fastening assembly, comprising:

an outer cylinder manufactured from a metal material with resistance to compression, an upper end of the outer cylinder is longitudinally provided with a contracted opening;

an annular shaped shoulder fastening ring, a lower portion of the shoulder fastening ring is provided with an embed link opening, and the embed link opening is axially joined to the contracted opening, an upper end of the shoulder fastening ring is provided with a restrain link opening, threaded teeth are provided on an outer surface of the shoulder fastening ring, an outer end inwardly bevels and contracts to configure a press opening, an inner cone ring is configured at an inner annular girth position of the shoulder fastening ring;

a mineral liner, an annular neck is contracted and configured on an upper end of the mineral liner through an extended shoulder portion, and an outer end of the annular neck forms an everted lip, a fastening portion is provided on a periphery of the lip, and the fastening portion enables push fastening onto the press opening;

an annular elastic blocking member, the blocking member is configured with a buffer cone ring, the buffer cone ring is annularly pressed and joined between an outer surface of the extended shoulder portion and an inner surface of the inner cone ring;

a cover, threaded teeth are provided on an inner circumference of the cover, and the threaded teeth screw onto and join with the threaded teeth of the shoulder fastening ring;

wherein an interior space of the outer cylinder is longitudinally lined with a cylinder liner, an upper end opening of the cylinder liner is seal joined to the contracted opening provided on the outer cylinder, and space between the cylinder liner and the outer cylinder creating a dual walled vacuum heat blocking surrounding layer; wherein the cylinder liner is able to mount the mineral liner in an interior thereof.

2. The mounting structure of the shock-proof mineral container according to claim 1, wherein the blocking member is configured with the buffer cone ring, a buffer ring is joined to an upper end of the buffer cone ring, and the buffer ring covers an outer circumference surface of the annular neck.

3. The mounting structure of the shock-proof mineral container according to claim 1, wherein the embed link opening provided on the shoulder fastening ring is provided with a ring clasp groove, the ring clasp groove fastens onto a fastening ring configured on an outer circumference of the contracted opening.

4. The mounting structure of the shock-proof mineral container according to claim 1, wherein an inter layer is formed between an outer surface of the mineral liner and inner surface of the outer cylinder including a base thereof.

5. The mounting structure of the shock-proof mineral container according to claim 1, wherein the mineral liner is manufactured from glass material, a body portion of the mineral liner and an outer surface of a base plate is covered with a heat radiation reflecting layer that enables internal reflection of heat waves toward an interior of the mineral liner.

6. The mounting structure of the shock-proof mineral container according to claim 1, wherein an inside bottom of an inner base plate of the cylinder liner is cushioned with an elastic positioning disc, and the positioning disc supports and is joined to a base plate of the mineral liner.

7. The mounting structure of the shock-proof mineral container according to claim 1, wherein an outer end of the lip protrudes higher than an upper end of the press opening.

* * * * *